Aug. 17, 1926.

A. H. LEIPERT 1,596,744

CUSHION CONNECTION FOR VEHICLE CONSTRUCTION

Filed July 21, 1925    2 Sheets-Sheet 1

INVENTOR
August H. Leipert
BY
his ATTORNEYS

Patented Aug. 17, 1926.

1,596,744

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

CUSHION CONNECTION FOR VEHICLE CONSTRUCTION.

Application filed July 21, 1925. Serial No. 44,965.

This invention relates to a cushion connection and support between parts of a vehicle, one of which parts is to be connected to and supported by the other part. In the patent to Alfred F. Masury and August H. Leipert, No. 1,404,876 dated January 31, 1922, there is disclosed a yielding non-metallic mechanical connection and support between parts of a vehicle wherein the cushion connection comprises yielding non-metallic material. The present invention seeks to provide a connection having many of the attributes of the patented construction but wherein the cushion connection is inflatable. In accordance with the invention a pneumatic device is carried with one of the vehicle parts and engages the other vehicle part. More particularly hollow inflatable interconnected lobes engage opposed sides of the end of one of the vehicle parts and are contained within a receptacle carried with the other vehicle part provision being made, if desired, to inflate the device to the desired degree of rigidity whereby stresses impressed upon one of the vehicle parts are resisted. The invention will now be described more particularly with reference to a preferred embodiment illustrated in the accompanying drawing, in which:—

Figure 1:
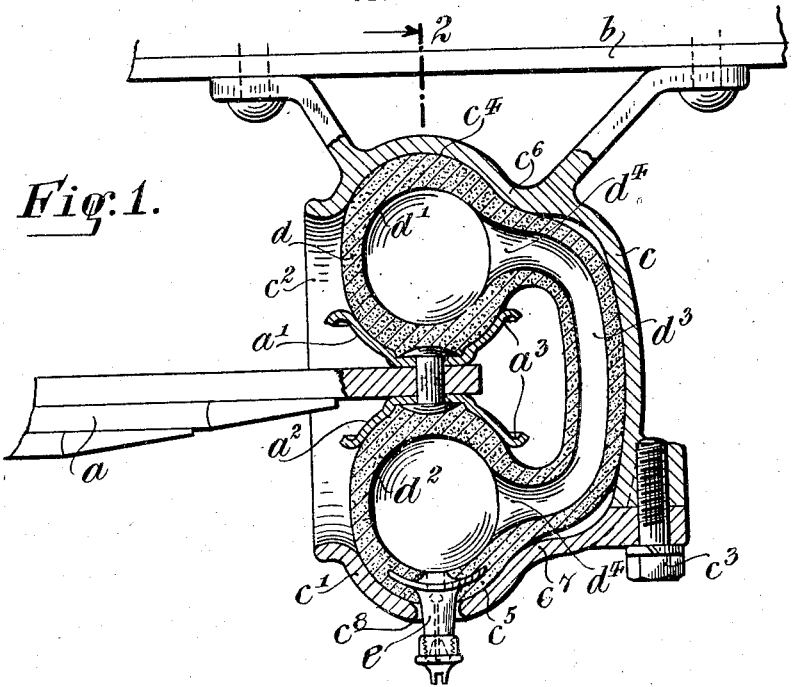
Figure 1 is a view in side elevation and partly in section showing the invention applied as a cushion connection and support between the frame and leaf spring of a motor vehicle.
Figure 2:
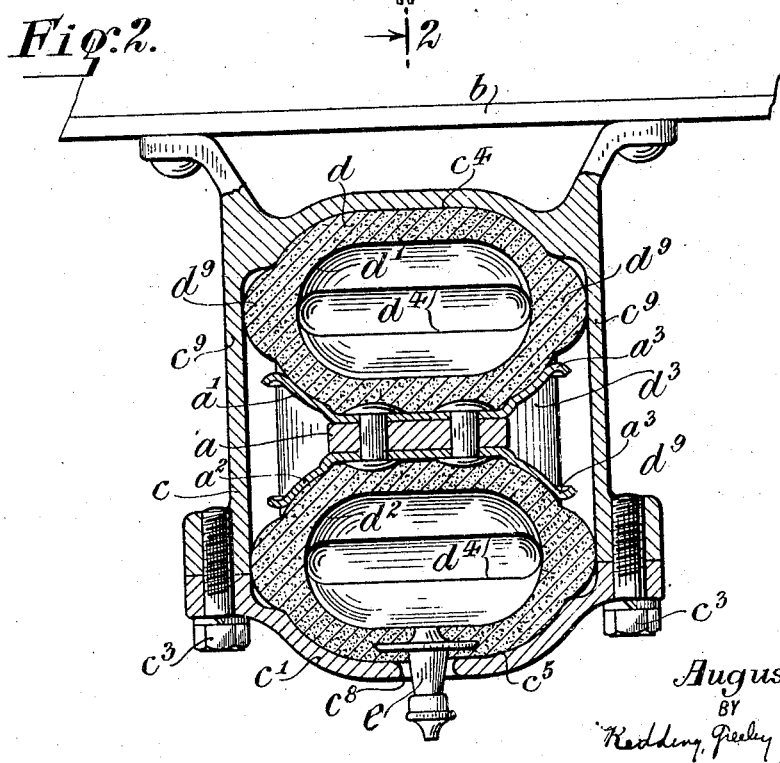
Figure 2 is a view taken in the plane indicated by the line 2—2 in Figure 1 and looking in the direction of the arrows.

Referring to the drawings the leaf spring of a motor vehicle is indicated at $a$ and a chassis side frame member at $b$. Carried with the frame member $b$ is a housing $c$ having a detachable lower side $c'$ and an opening $c^2$ in one face thereof through which the end of the spring $a$ extends. The detachable side $c'$ may be secured to the housing proper $c$ by means of bolts or the like $c^3$. Within the housing is disposed a hollow member indicated in general at $d$. This member is preferably formed of two enlarged portions or lobes $d'$, $d^2$ disposed above and below the end of the spring and forming load and rebound sections, respectively. The upper inner wall of the housing is formed with a curvilinear recess $c^4$ forming a seat for the top surface of the lobe $d'$ and a similar seat $c^5$ is formed in the detachable wall for the rebound sections $d^2$. Co-operating seats $a'$, $a^2$ may be secured to the end of the leaf spring to receive the proximate surfaces of the respective lobes. Connecting the lobes $d'$ and $d^2$ is channel section $d^3$ wherein a portion of the passage as at $d^4$ extends substantially parallel to the axis of the spring and lies between shoulders $c^6$ formed in the housing proper and $c^7$ formed in the detachable side $c'$ and the inner edges $a^3$ of the seats $a'$, $a^2$.

Obviously the pneumatic connecting element $d$ may be inflated to the desired degree before insertion in the housing or may be provided with a valve $e$ extending through an aperture $c^8$ at any convenient point in the housing by which the cushion connection may be inflated to the desired degree. The walls of the connection may be formed of any yielding non-metallic material, such as rubber, and may, if desired, be re-enforced either by cords $f$ or may be of fabricated rubber $g$. It may even be provided with what may be termed an inner tube or air chamber $h$.

Figure 3:
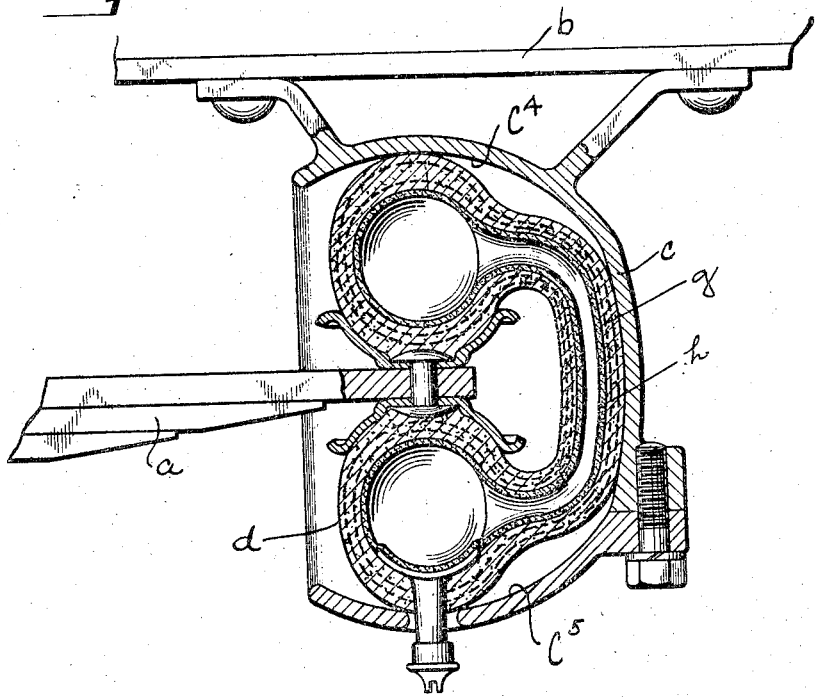
Figure 3 is a view similar to Figure 1 but showing the re-enforcement of the walls of the connection with fabric and the use of an inner tube or chamber for the inflating medium.
Figure 4:
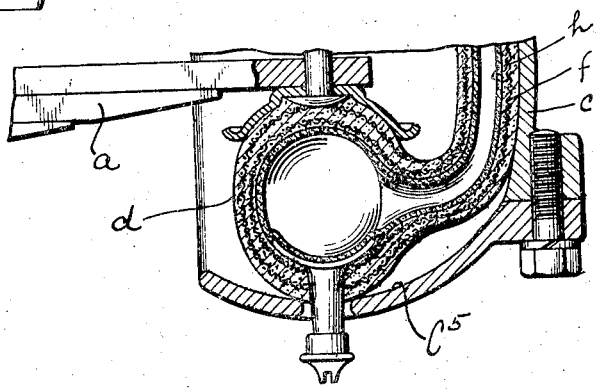
Figure 4 is a fragmentary view, similar to Figure 3, but showing the use of cord re-enforcement in the connection.

The co-operating seats may be so formed as at $c^4$, $c^5$ to engage the pneumatic connection rigidly so that there is no relative movement therebetween or they may be so curved as at $c^4$, $c^5$ Figures 3 and 4 to permit a rolling motion to take place between a lobe and its seat during spring elongation.

Cushions $d^9$ may be formed upon either side of the lobes to engage the side walls $c^9$ of the housing and contribute to the resistance which the connection affords the spring to twisting movements and side sway.

The passage $d^4$ may be so proportioned that upon flexing of the spring under load and rebound conditions the shoulders $c^6$, $c^7$ and $a^3$ will compress or pinch the passages and confine the air within a lobe whereby the pressure therewithin is momentarily increased to resist the added stress.

It will thus be seen that a cushion connection is provided between parts of a vehicle one of which parts is to be connected to and supported by the other where metal to metal contact is avoided and the degree of rigidity of the engagement of the respective parts may be determined by the amount of compression of the air within the pneumatic connection.

Various modifications may be made in the arrangement and configuration of the pneumatic connection and co-operating parts and no limitation is intended by the foregoing description or accompanying illustrations except as indicated in the appended claims.

What I claim is:—

1. A yielding non-metallic mechanical connection and support between parts of a vehicle, one of which parts is to be connected to and supported by the other part comprising pneumatic devices carried with one part and engaging the other part and resisting tortion thereof.

2. A yielding non-metallic mechanical connection and support between parts of a vehicle, one of which parts is to be connected to and supported by the other part comprising a hollow inflatable cushion connection carried with one of the parts and engaging the other part and resisting tortion thereof.

3. A yielding non-metallic mechanical connection and support between parts of a vehicle, one of which parts is to be connected to and supported by the other part comprising a housing carried with one of the vehicle parts and interconnected inflatable portions engaging opposed sides of the other part.

4. A yielding non-metallic mechanical connection and support between the spring and frame of a vehicle comprising a housing carried with the frame having an open side into which the end of the spring extends, interconnected inflatable portions disposed within the housing and engaging the upper and lower sides of the end of the spring, and means to inflate the connection.

5. A yielding non-metallic mechanical connection and support between the spring and frame of a vehicle comprising a housing carried with the frame having an open side into which the end of the spring extends, interconnected inflatable portions disposed within the housing and engaging the upper and lower sides of the end of the spring, and means to isolate the gas content of a portion.

6. A yielding non-metallic mechanical connection and support between parts of a vehicle, one of which parts is to be connected to and supported by the other part comprising co-operating curvilinear seats carried with the respective parts and a hollow inflatable cushion connection having curvilinear portions carried with the seat on one of the parts and engaging the seat on the other part.

7. A yielding non-metallic mechanical connection and support between parts of a vehicle, one of which parts is to be connected to and supported by the other part comprising a housing carried with one of the parts, formed with opposed curvilinear seats and an opening into which the other part extends, opposed curvilinear seats carried with the other part to co-operate with the first named seats, respectively, and inflatable cushions disposed within the housing and engaging the entering part and formed with curvilinear portions engaging the seats.

8. A yielding non-metallic mechanical connection and support between parts of a vehicle, one of which parts is to be connected to and supported by the other part comprising a hollow inflatable cushion connection carried with one of the parts and engaging the other part and including a separate inner air chamber.

9. A yielding non-metallic mechanical connection and support between parts of a vehicle, one of which parts is to be connected to and supported by the other part comprising co-operating curvilinear seats of predetermined radius carried with the respective parts and a hollow inflatable cushion connection having curvilinear portions of a different radius of curvature carried with the seat on one of the parts and engaging the seat on the other part.

10. A yielding non-metallic mechanical connection and support between parts of a vehicle, one of which parts is to be connected to and supported by the other part comprising a hollow inflatable re-enforced cushion connection carried with one of the parts and engaging the other part.

This specification signed this 14th day of July, A. D., 1925.

AUGUST H. LEIPERT.